US009361013B2

(12) United States Patent
Schlegel

(10) Patent No.: US 9,361,013 B2
(45) Date of Patent: *Jun. 7, 2016

(54) STICKY FUNCTIONALITY

(75) Inventor: Eric Schlegel, Redmond, WA (US)

(73) Assignee: Apple Inc., Cupertino, CA (US)

(*) Notice: Subject to any disclaimer, the term of this patent is extended or adjusted under 35 U.S.C. 154(b) by 791 days.

This patent is subject to a terminal disclaimer.

(21) Appl. No.: 13/371,094

(22) Filed: Feb. 10, 2012

(65) Prior Publication Data
US 2012/0210264 A1 Aug. 16, 2012

Related U.S. Application Data

(63) Continuation of application No. 12/707,637, filed on Feb. 17, 2010, now Pat. No. 8,140,972, which is a continuation of application No. 10/316,903, filed on Dec. 12, 2002, now Pat. No. 7,689,914.

(51) Int. Cl.
G06F 3/00 (2006.01)
G06F 9/00 (2006.01)
G06F 17/00 (2006.01)
G06F 3/0486 (2013.01)

(52) U.S. Cl.
CPC .................... G06F 3/0486 (2013.01)

(58) Field of Classification Search
CPC ....... G06F 9/4443; G06F 8/34; G06F 3/0486; G06F 8/38; G06F 3/0481; G06F 3/0482; G06F 3/04812; G06F 3/04847; G06Q 10/10; H04N 1/00389; H04N 1/00411
USPC ......... 715/760, 762, 763, 765, 711, 862, 863, 715/864, 865, 866
See application file for complete search history.

(56) References Cited

U.S. PATENT DOCUMENTS

| 5,406,307 A * | 4/1995 | Hirayama et al. ............ 715/800 |
| 5,483,261 A | 1/1996 | Yasutake |
| 5,488,204 A | 1/1996 | Mead et al. |
| 5,550,969 A | 8/1996 | Torres et al. |
| 5,764,218 A | 6/1998 | Della Bona et al. |
| 5,764,873 A | 6/1998 | Magid et al. |

(Continued)

FOREIGN PATENT DOCUMENTS

| JP | 2000-163031 A | 6/2000 |
| JP | 2002-342033 A | 11/2002 |

OTHER PUBLICATIONS

Anonymous. (1997). MAC OS8, Human Interface Guidelines, Technical Publications, *Apple Computer, Inc.*, pp. 3-5, 92, 93.

(Continued)

*Primary Examiner* — Keiu Vu
*Assistant Examiner* — Anita D Chaudhuri
(74) *Attorney, Agent, or Firm* — Morrison & Foerster LLP

(57) ABSTRACT

Manipulation of elements in a graphical user interface is aided by allowing the graphical user interface to treat certain mouse button actuation and releases as holding the mouse button in an actuated state. When predetermined conditions are satisfied, the graphical user interface will treat a mouse button actuation and release as if the mouse button were held in an actuated state. A user can then manipulate elements in the graphical user interface as if the user held the mouse button in an actuated state. The types of manipulation can include the moving of a window, the resizing of a window, moving an icon, and the scrolling through the visible portion of a window.

27 Claims, 4 Drawing Sheets

(56) References Cited

U.S. PATENT DOCUMENTS

| | | | |
|---|---|---|---|
| 5,777,616 | A | 7/1998 | Bates et al. |
| 5,786,805 | A | 7/1998 | Barry |
| 5,801,699 | A | 9/1998 | Hocker et al. |
| 5,825,352 | A | 10/1998 | Bisset et al. |
| 5,835,079 | A | 11/1998 | Shieh |
| 5,880,411 | A | 3/1999 | Gillespie et al. |
| 5,880,717 | A | 3/1999 | Chan et al. |
| 5,907,327 | A | 5/1999 | Ogura et al. |
| 5,956,736 | A * | 9/1999 | Hanson et al. ............... 715/234 |
| 6,028,271 | A * | 2/2000 | Gillespie ............ G06F 3/03547 178/18.01 |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,686,938 | B1 | 2/2004 | Jobs et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 7,689,914 | B2 | 3/2010 | Schlegel |
| 8,140,972 | B2 | 3/2012 | Schlegel |
| 8,479,122 | B2 | 7/2013 | Hotelling et al. |
| 2002/0054133 | A1* | 5/2002 | Jameson ...................... 345/788 |
| 2002/0154173 | A1* | 10/2002 | Etgen ................ G06F 3/04855 715/833 |
| 2002/0191027 | A1 | 12/2002 | Morrow et al. |
| 2006/0026521 | A1 | 2/2006 | Hotelling et al. |
| 2006/0197753 | A1 | 9/2006 | Hotelling |
| 2012/0290961 | A1 | 11/2012 | Schlegel |

OTHER PUBLICATIONS

Anonymous. (Jun. 2002). Inside Mac Os X, Aqua Human Interface Guidelines, *Apple Computer, Inc.*, pp. 2-11, 51.

Final Office Action mailed Oct. 2, 2006, for U.S. Appl. No. 10/316,903, filed Dec. 12, 2002, nine pages.

Final Office Action mailed May 27, 2011, for U.S. Appl. No. 12/707,637, filed Feb. 17, 2010, 12 pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action mailed Mar. 7, 2006, for U.S. Appl. No. 10/316,903, filed Dec. 12, 2002, seven pages.

Non-Final Office Action mailed Nov. 12, 2010, for U.S. Appl. No. 12/707,637, filed Feb. 17, 2010, 14 pages.

Notice of Allowance mailed Nov. 17, 2009, for U.S. Appl. No. 10/316,903, filed Dec. 12, 2002, seven pages.

Notice of Allowance mailed Nov. 16, 2011, for U.S. Appl. No. 12/707,637, filed Feb. 17, 2010, 10 pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action mailed Dec. 22, 2014, for U.S. Appl. No. 13/370,998, filed Feb. 10, 2012, 11 pages.

Final Office Action mailed Jul. 6, 2015, for U.S. Appl. No. 13/370,998, filed Feb. 10, 2012, 13 pages.

Notice of Allowance mailed Mar. 29, 2016, for U.S. Appl. No. 13/370,998, filed Feb. 10, 2012, seven pages.

Notice of Allowance (corrected) mailed Apr. 21, 2016, for U.S. Appl. No. 13/370,998, filed Feb. 10, 2012, four pages.

\* cited by examiner

STICKY FUNCTIONALITY

This is a continuation of U.S. application Ser. No. 12/707,637 filed on Jul. 17, 2010, which is a continuation of U.S. application Ser. No. 10/316,903 filed on Dec. 12, 2002, which is now U.S. Pat. No. 7,689,914.

FIELD OF THE INVENTION

The present invention generally relates to graphical user interfaces for computer systems, and more particularly to a user interface which allows easier manipulation of elements of the user interface via a cursor control device such as a mouse.

BACKGROUND OF THE INVENTION

An important aspect of any computer system is the interface that allows a user to input commands and data, and to receive the results of operations performed within the computer. In the area of personal computers, the graphical user interface (GUI) has become almost ubiquitous. The most popular types of GUI are based upon a metaphor that emulates the desktop environment. These types of GUI employ various visual elements to assist the user in managing information within the computer. One fundamental element is windows. Windows function as container elements, via which information is presented to the user, and in which the user enters data to be input to the computer. The main, or root window, is commonly referred to as the "desktop" area and functions as the primary display region.

One of the main advantages of the GUI compared to other interfaces is ease of use. The ease of use of any particular GUI is based upon certain assumptions which may not hold true for all users. One function in which these assumptions may not always hold true is the use of a mouse to control manipulation of elements of the GUI. Specifically, GUIs are typically designed with the assumption that the user will employ a desktop-type mouse. The manipulation of elements of the GUI using the desktop-type mouse requires manipulation of a button of the mouse while moving an associated cursor about the GUI. The manipulation of a button of the mouse involves actuation and release of the button. Moving a cursor associated with the desktop-type mouse involves either physically moving the mouse, or by rolling a ball associated with the mouse, in the direction in which it is desired for the associated cursor to move.

To maintain a compact design, many laptop computers include a trackpad instead of a desktop-type mouse. These trackpads make it difficult to move the associated cursor while manipulating a button on the mouse. To solve this problem, some laptop computers include special modes in which tapping on the trackpad simulates a mouse button actuation which is held in that actuation state until a subsequent tap on the trackpad. However, this type of special mode tends to interfere with other uses of the trackpad, and would not be available to a user of the laptop computer if the user were employing an external desktop-type mouse for manipulation of the cursor. Another problem with cursor manipulation in GUIs concerns people with physical disabilities. It can be difficult for people with physical disabilities to hold a mouse button in an actuated state while manipulating the mouse to move the cursor about the GUI.

Accordingly, it is desirable to provide techniques which simplify an actuation of a mouse button while moving an associated cursor about the GUI. These techniques would be particularly desirable for users of laptop computers with trackpads, and for users of all types of computers who have physical disabilities.

SUMMARY

In pursuit of this objective, the present invention allows functionality normally requiring an input device to be in a second state to be performed while the input device is in a first state. For example, in the case of a mouse as the input device, the present invention allows functionality normally requiring the mouse button to be held in an actuated state to be performed without maintaining the mouse button in the actuated state. In accordance with exemplary embodiments of the present invention this functionality can be employed for movement of a window about the GUI, movement of an icon about the GUI, resizing a window, and manipulation of a scrollbar or slider of a window. To avoid inadvertent enablement of such functionality, the present invention provides predetermined conditions prior to evoking such functionality. The present invention also provides a simple mechanism for terminating the actuated state of the mouse button with respect to the GUI.

BRIEF DESCRIPTION OF THE DRAWING FIGURES

DETAILED DESCRIPTION

Figure 1:
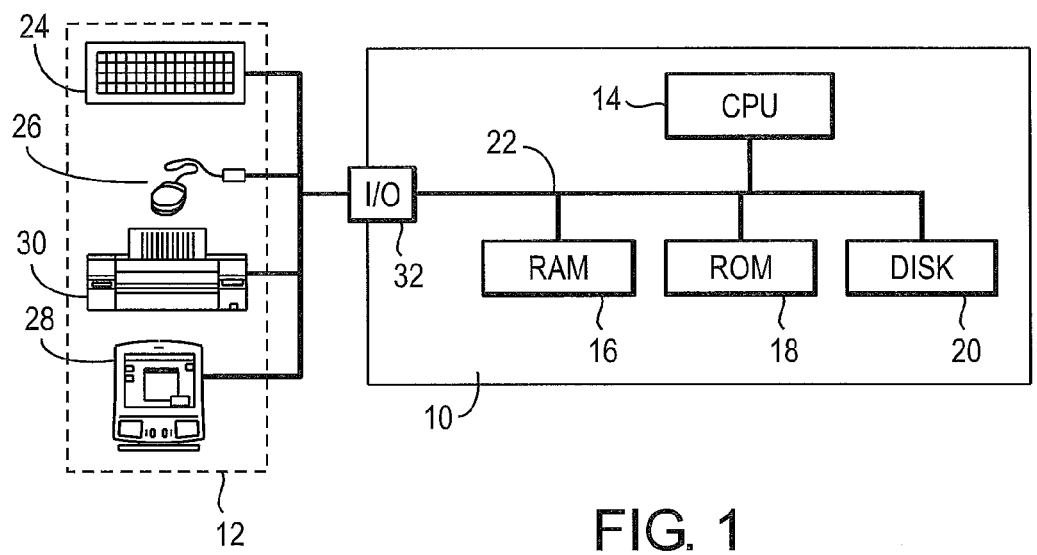
FIG. 1 is a block diagram of the general architecture of a computer system in which the present invention can be implemented.

The various features of the invention will now be described with reference to the figures, in which like parts are identified with the same reference characters.

In the following description, for the purposes of explanation and not limitation, specific details are set forth in order to provide a thorough understanding of the present invention. However, it will be apparent to one skilled in the art that the present invention may be practiced in other embodiments that depart from the specific details. In other instances, detailed descriptions of well known methods, devices, and circuits are omitted so as not to obscure the description of the present invention.

FIG. 1 illustrates an exemplary computer system which includes a computer 10 having a variety of external peripheral devices 12 connected thereto. The computer 10 includes a central processing unit (CPU) 14 and associated memory. This memory generally includes a main memory which is typically implemented in the form of random access memory (RAM) 16, a static memory that can comprise a read only memory (ROM) 18, and a permanent storage device, such as magnetic or optical disk 20, or other suitable computer-readable media. The CPU 14 communicates with each of these forms of memory through an internal bus 22. Typically, the operating system for the computer, including the graphical user interface, is permanently stored on the media 20 and loaded into the random access memory 16, for execution during operation of the computer.

The peripheral devices can include a data entry device such as keyboard 24, and a pointing or cursor control device 26 such as a mouse, trackball, pen or the like. A display device 28, such as a CRT monitor, and LCD screen or a plasma display, provides the visual portion of the graphical user interface, to facilitate the user's interaction with the operation of the computer. Other peripheral devices, such as a printer 30, can also be connected to the computer and controlled through the graphical user interface. Each of these external peripheral devices communicates with the CPU 14 by means of one or more input/output ports 32 on the computer. Although FIG. 1 illustrates a typical desktop computer, the present invention is also applicable to laptop computers, palmtop computers, tablet computers and the like.

Figure 2:
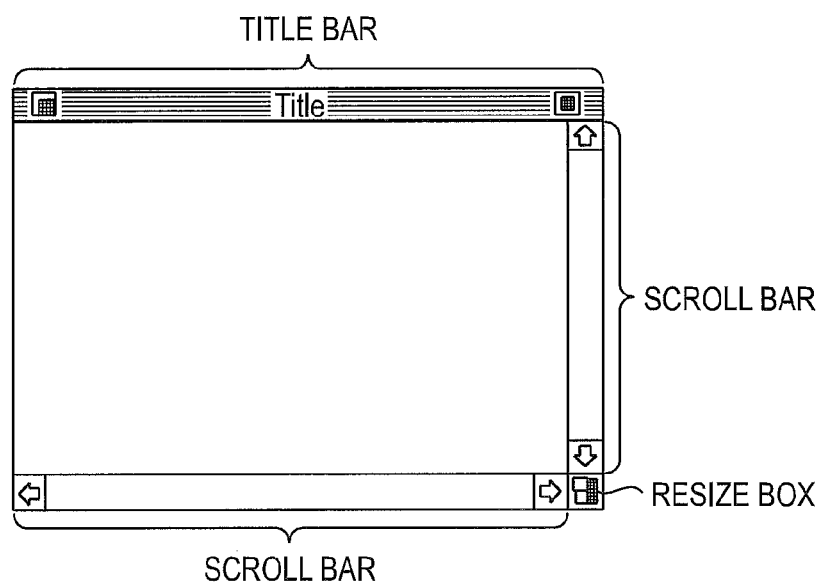
FIG. 2 illustrates an exemplary window upon which the functionality of the present invention can be implemented.

FIG. 2 illustrates an exemplary window used in connection with the present invention. The window illustrated in FIG. 2 includes a title bar, two scrollbars, and a resize box. The title bar identifies the window. Conventionally, when the cursor is on top of the title bar and the mouse button is held in an actuated state, the window will follow the movement of the mouse. It will be recognized that moving elements of a user interface based on movements of an input device such as a mouse is known in the art as dragging the element.

When a window contains more information than can be contained within the visible portion of the window, the scrollbars are employed to view information contained within the window, but which is not visible within the user interface. Conventionally, when the cursor is positioned on either of the arrows of the scrollbar and the mouse button is held in an actuated state, the portion of the window which is visible will scroll in the direction of the arrow. In addition, the scrollbar can contain a slider element. The slider element is employed to view contents of the window which are not currently visible by positioning the cursor on top of the slider while the mouse button is held in an actuated state, and the slider bar will follow the subsequent movement of the mouse. Accordingly, this mouse movement results in dragging the slider bar. It will also be recognized that instead of a scrollbar a slider bar, i.e., a scrollbar without the arrows, can be employed for viewing contents of the window which are not currently visible.

The resize box is employed to change the size of the visible portion of the window. Conventionally, when the cursor is positioned over the resize box and the mouse button is held in an actuated state, movement of the mouse will control the size of the visible portion of the window. Accordingly, this mouse movement will result in dragging the resize box about the user interface. It should be recognized that the window illustrated in FIG. 2 is merely exemplary, and that the elements illustrated in FIG. 2 can be arranged in other manners. It is the functionality provided by the elements illustrated in FIG. 2 which are employed in the present invention.

The present invention allows movement of a window to follow the movement of a mouse when the button on the mouse is not held in an actuated state. In addition, the present invention allows scrolling through the visible portion of the window in accordance with movement of the mouse when the mouse button is not held in an actuated state. Moreover, the present invention allows the window to be resized in accordance with the movement of the mouse when the mouse button is not held in an actuated state.

The user interface treating a mouse button actuation and release which meets certain predetermined conditions the same as holding the mouse button in an actuated state can be referred to as "sticky functionality" because the user interface treats subsequent mouse movements as if the mouse button were stuck in the actuated state. Currently the only implementation of such sticky functionality is in connection with menus. For example, in some Apple Macintosh7 operating systems (OS) if a mouse button actuation occurs on top of a menu title, and the time for actuation and release is less than the double-click interval for the system, the menu exhibits sticky functionality. However, currently the Apple Macintosh7 OS limit the sticky functionality to the manipulation of menus. By extending the sticky functionality beyond menus to windows and controls, the present invention increases the overall ease of use of a user interface.

Figure 3:
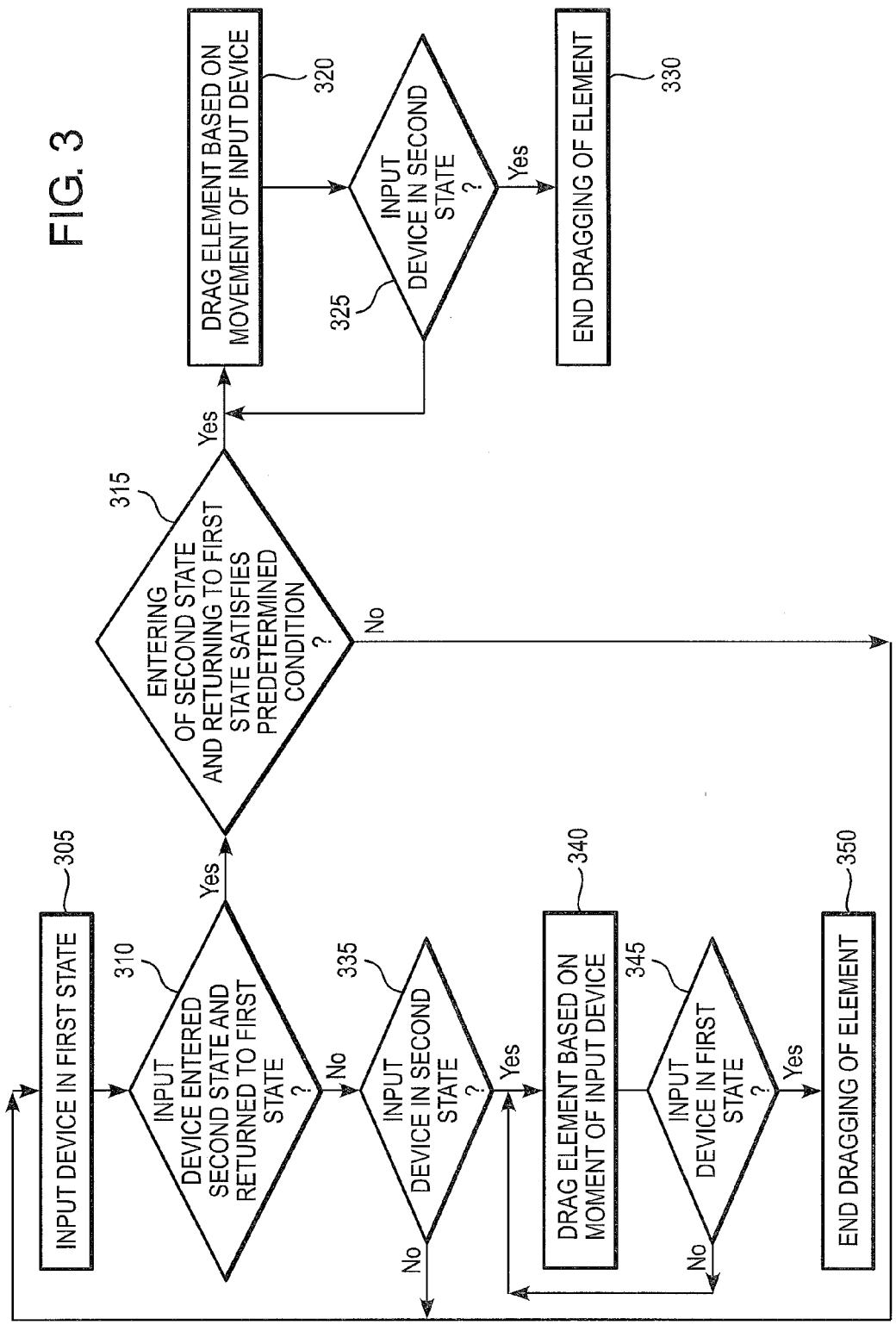
FIG. 3 illustrates an exemplary method in accordance with the present invention.

FIG. 3 is an overview of the method of the present invention. Initially, an input device is in a first state (step 305). Next, it is determined whether the input device has entered a second state and returned to the first state (step 310). If the input device has entered a second state and returned to the first state ("YES" path out of decision step 310), then it is determined whether the entering of the second state and returning to the first state satisfies a predetermined condition (step 315). If the entering of the second state and returning to the first state does not satisfy a predetermined condition ("NO" path out of decision step 315), then the input device is returned to the first state (step 305) without invoking any particular functionality.

If the entering of the second state and returning to the first state does satisfy a predetermined condition ("YES" path out of decision step 315), then an element of the user interface is dragged based upon movement of the input device (step 320). Next it is determined whether the input device has entered the second state (step 325). If the input device has entered the second state ("YES" path out of decision step 325), then dragging of the element is ended (step 330). If, however, the input device is not in the second state ("NO" path out of decision step 325), then the element continues to be dragged about the user interface based upon movement of the input device (step 320).

If the input device has not entered the second state ("NO" path out of decision step 310), then it is determined whether the input device is in a second state (step 335). If it is determined that the input device is not in the second state ("NO" path out of decision step 335), then the input device is in the first state (step 305). If, however, the input device is in the second state ("YES" path out of decision step 335), then the element is dragged based upon movement of the input device (step 340). Next it is determined whether the input device is in the first state (step 345). If the input device is not in the first state ("NO" path out of decision step 345), then the element continues to be dragged based upon movement of the input device (step 340). If the input device is in the first state ("YES" path out of decision step 345), then dragging of the element is ended (step 350).

It should be recognized that the functionality described in steps 340 through 350 is the conventional functionality of dragging an element of a user interface when an input device is moved from a first state and held in a second state, e.g., the holding of a mouse button. Steps 305 through 330 highlight the present invention in that dragging of an element of a user interface is performed when the input device has entered a second state and returned to a first state, where conventionally no particular functionality would be invoked by the input device.

Figure 4A:
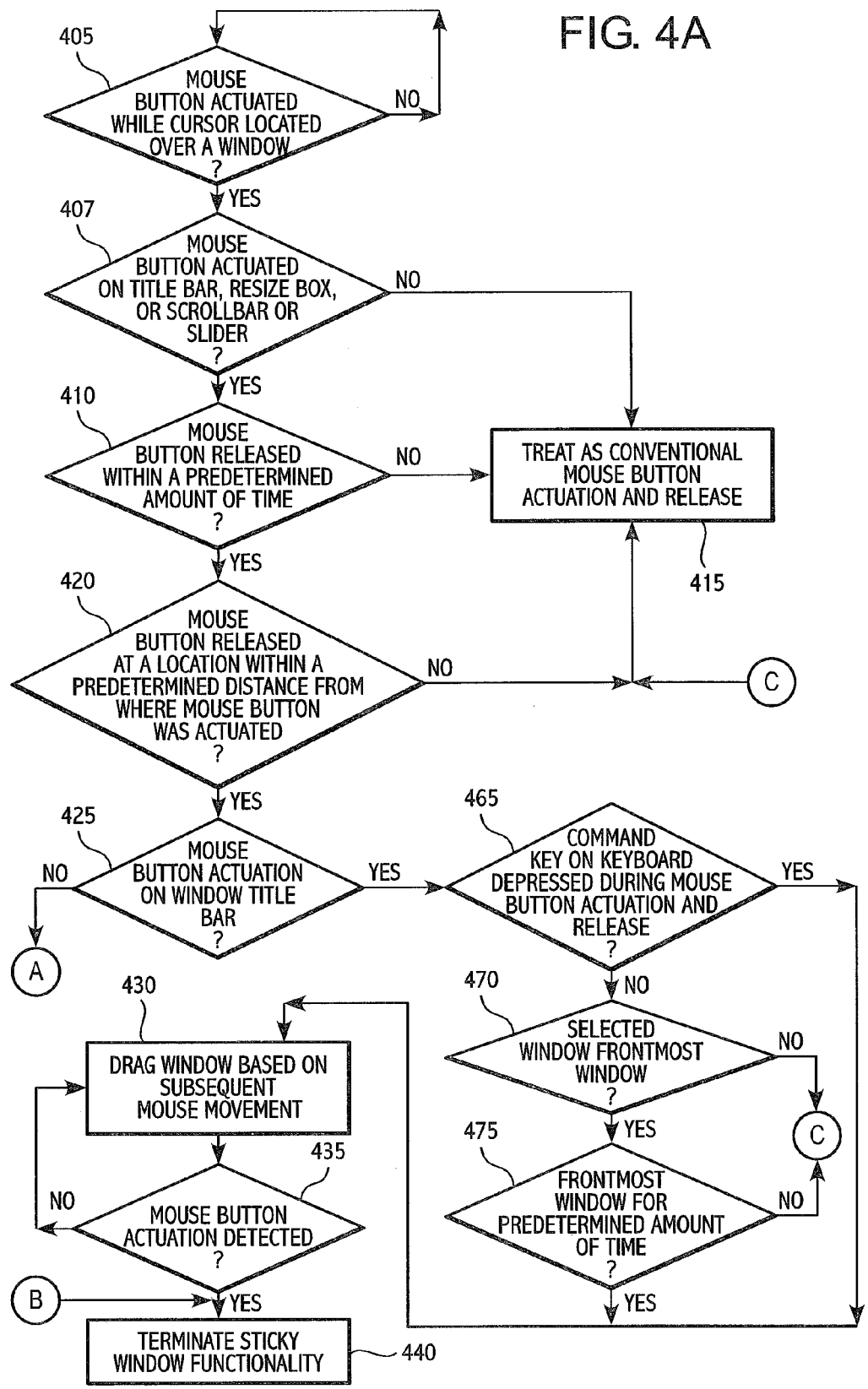
FIGS. 4A and 4B illustrate an exemplary method for invoking the mouse button actuation functionality, the functionality itself, and the ending of such functionality in accordance with the present invention.
Figure 4B:
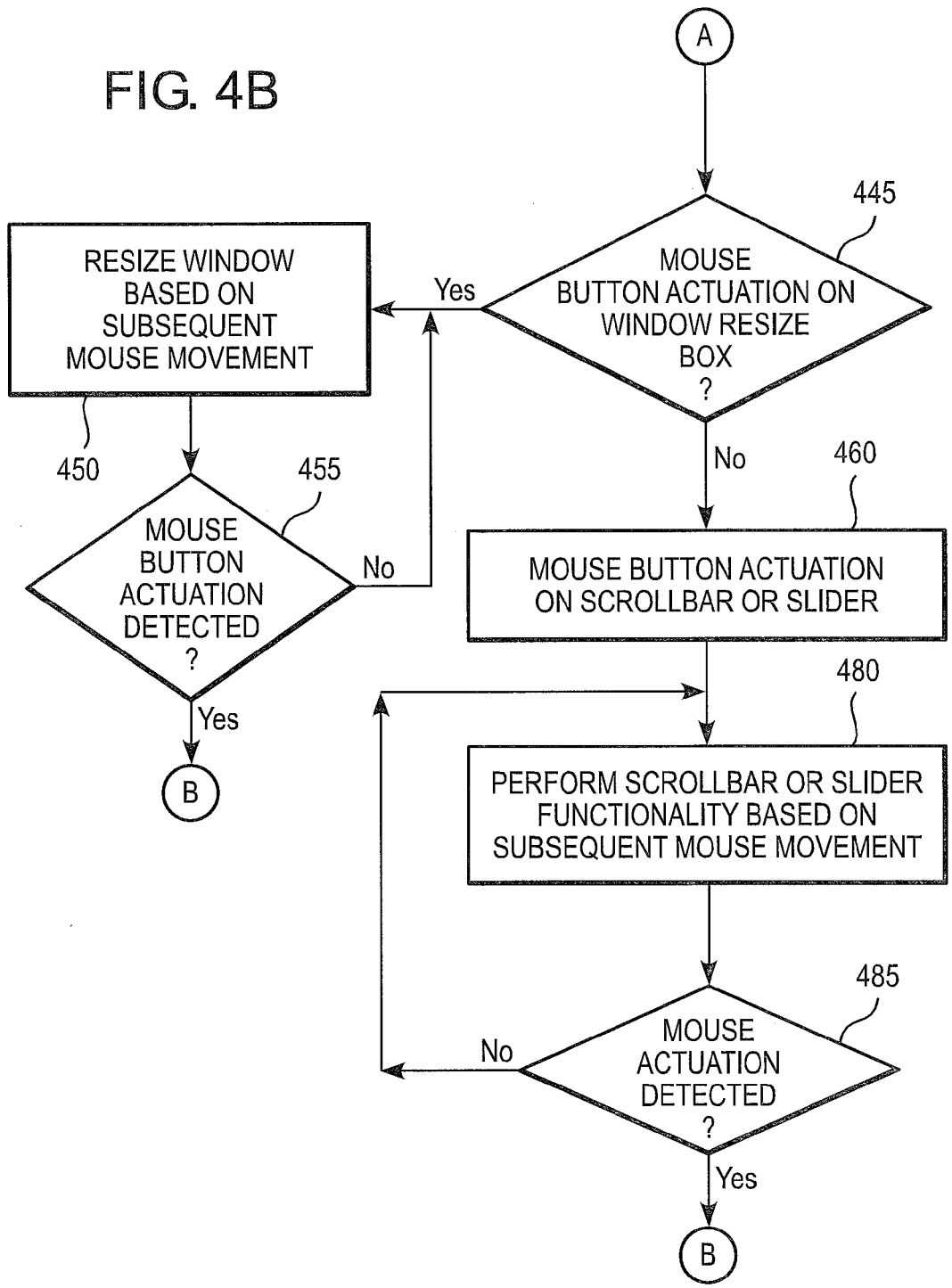

FIGS. 4A and 4B illustrate an exemplary method in accordance with the present invention. Initially, it is determined whether the mouse button has been actuated while the cursor is located over a window (step 405). If the mouse button was not actuated while the cursor is located over a window ("NO" path out of decision step 405), the determination of whether the mouse button has been actuated over a window is repeated. If, however, the mouse button is actuated while the cursor was located over a window ("YES" path out of decision step 405), then it is determined whether the mouse button was actuated on a window title bar, resize box, or scrollbar or slider (step 407). If the mouse button was not actuated on a window title bar, resize box, or scrollbar or slider ("NO" path out of decision step 407), then the system treats the actuation and release of the mouse button in accordance with conventional procedures (step 415).

If it is determined that the mouse button was actuated on a window title bar, resize box, or scrollbar or slider ("YES" path out of decision step 407), then it is determined whether the mouse button was released within a predetermined amount of time (step 410). In accordance with exemplary embodiments of the present invention, the predetermined amount of time can be set by default to ⅓ second. However, this default value can be modified to suit the user's preference. The length of the predetermined amount of time should be selected to avoid inadvertently invoking the sticky functionality. If the mouse button was not released within a predetermined amount of time ("NO" path out of decision step 410), then the system treats the actuation and release of the mouse button in accordance with conventional procedures (step 415).

If the mouse button was released within a predetermined amount of time ("YES" path out of decision step 410), then it is determined whether the mouse button was released at a location within a predetermined distance from where the mouse button was actuated (step 420). In accordance with exemplary embodiments of the present invention, the predetermined distance is a 12 pixel by 12 pixel box centered around the location where the mouse button actuation occurred. It should be recognized that the predetermined distance can be any value which is selected to avoid inadvertently invoking sticky functionality. If it is determined that the mouse button was not released at a location within a predetermined distance from where the mouse button was actuated ("NO" path out of decision step 420), then the actuation and release of the mouse button is handled in accordance with conventional procedures (step 415).

If it is determined that the mouse button was released at a location within a predetermined distance from where the mouse button was actuated ("YES" path out of decision step 420), then it is determined whether the mouse button was actuated on the window title bar (step 425). If it is determined that the mouse button actuation was on the window title bar ("YES" path out of decision step 425), then it is determined whether a command key on the keyboard was depressed during the mouse button actuation and release (step 465). If it is determined that a command key on the keyboard was not depressed during mouse button actuation and release ("NO" path out of decision step 465), then it is determined whether the selected window was the frontmost window (step 470). If it is determined that the selected window is the frontmost window ("YES" path out of decision step 470), then it is determined whether the selected window was the frontmost window for a predetermined amount of time (step 475). In accordance with exemplary embodiments of the present invention, the predetermined amount of time is ⅔ second. It should be recognized that the predetermined amount of time is selected to avoid inadvertently invoking sticky functionality. If it is determined that the selected window is not the frontmost window ("NO" path out of decision step 470) or if it is determined that the selected window was not the frontmost window for a predetermined amount of time ("NO" path out of decision step 475), then the mouse button actuation and release are handled in accordance with conventional procedures (step 415). It should be recognized that the conditions set forth in steps 465, 470 and 475 are designed to prevent invoking sticky windows functionality by a single mouse button actuation on a background window when the user only intended to activate the background window.

If it is determined that the command key on the keyboard was depressed during the mouse button actuation and release ("YES" path out of decision step 465) or if it is determined that the selected window was the frontmost window for a predetermined amount of time ("YES" path out of decision step 475), then the window is dragged about the GUI based on the subsequent mouse movement (step 430). Next is it determined whether a subsequent mouse button actuation has been detected (step 435). If the mouse button actuation has not been detected ("NO" path out of decision step 435), then the window continues to be dragged based upon subsequent mouse movement (step 430). If, however, the mouse button actuation has been detected ("YES" path out of decision step 435), then the sticky window functionality is terminated (step 440).

If it is determined that the mouse button actuation was not on the window title bar ("NO" path out of decision step 425), then it is determined whether the mouse button actuation was on the window resize box (step 445). If it is determined that the mouse button actuation was on the window resize box ("YES" path out of decision step 445), then the window is resized based upon subsequent mouse movement (step 450). Next it is determined whether a subsequent mouse button actuation has been detected (step 455). If it is determined that a mouse button actuation has not been detected ("NO" path out of decision step 455), then resizing of the window continues based upon subsequent mouse movement (step 450). If, however, a subsequent mouse actuation has been detected ("YES" path out of decision step 455), then the sticky window functionality is terminated (step 440).

If it is determined that the mouse button actuation was not on the window resize box ("NO" path out of decision step 445), then it is determined that the mouse button actuation was on a scrollbar or slider (step 460). Accordingly, scrollbar or slider functionality is performed based upon subsequent mouse movement (step 480). Next it is determined whether a subsequent mouse button actuation has been detected (step 485). If it is determined that a subsequent mouse button actuation has not been detected ("NO" path out of decision step 485), then scrollbar or slider functionality based upon subsequent mouse movement continues to be performed (step 480). If, however, it is determined that a subsequent mouse button actuation has been detected ("YES" path out of decision step 485), then the sticky window functionality is terminated (step 440).

Although FIGS. 4A and 4B have been described with separate steps for determining whether the mouse button was actuated on a title bar, resize box, or scrollbar or slider (step 407), and for determining whether the mouse button was actuated on a window title bar (step 425) or on a window resize box (step 445), these separate determinations have been described merely for ease of explanation. However, the present invention need only make this determination once, e.g., at step 407, and the subsequent decisions (steps 425 and 445) are based upon the determination performed during step 407.

Although the present invention has been described in connection with the manipulation of particular elements of a user interface, the present invention is not limited to such elements. For example, the present invention can also be used to manipulate icons in the user interface.

The invention has been described herein with reference to particular embodiments. However, it will be readily apparent to those skilled in the art that it may be possible to embody the invention in specific forms other than those described above. This may be done without departing from the spirit of the invention. Embodiments described above are merely illustrative and should not be considered restrictive in any way. The scope of the invention is given by the appended claims, rather than the proceeding description, and all variations and equivalents which fall within the range of the claims are intended to be embraced therein.

What is claimed is:

1. A method comprising:
   at an electronic device with a display and an input device:
   displaying a graphical user interface element on the display;
   while displaying the graphical user interface element on the display, detecting an input that includes transitioning the input device from a first state to a second state and movement input from the input device, wherein in both the first state and the second state the device is configured to detect movement input from the input device; and
   in response to the input:
   in accordance with a determination that the input device transitioned back from the second state to the first state within a threshold amount of time after the input device transitioned to the second state, adjusting the graphical user interface element in accordance with the movement input from the input device while the input device is in the second state and continuing to adjust the graphical user interface element in accordance with movement input from the input device while the input device is in the first state; and
   in accordance with a determination that the input device transitioned back from the second state to the first state after the threshold amount of time has elapsed, adjusting the graphical user interface element in accordance with movement input for the input device while the input device is in the second state and ceasing to adjust the graphical user interface element in accordance with the movement input from the input device after the input device has transitioned back to the first state.

2. The method of claim 1, wherein said input device comprises an actuation element, and wherein said actuation element is not actuated in said first state and is actuated in said second state.

3. The method of claim 2, wherein said actuation element is a button.

4. The method of claim 1, wherein said graphical user interface element is an icon.

5. The method of claim 1, wherein said graphical user interface element is a window.

6. The method of claim 5, wherein adjusting said graphical user interface element in accordance with the movement input from the input device comprises:
   dragging the window about the user interface in accordance with the movement input from the input device.

7. The method of claim 1, wherein said graphical user interface element is a resize box of a window, and wherein adjusting said graphical user interface element in accordance with the movement input from the input device comprises:
   dragging said resize box about the user interface in accordance with the movement input from the input device, thereby resizing said window.

8. The method of claim 1, wherein said graphical user interface element is a slider, and wherein adjusting said graphical user interface element in accordance with the movement input from the input device comprises:
   dragging said slider in accordance with the movement input from the input device.

9. The method of claim 8, wherein said slider is a component of a window, and wherein said dragging changes a viewable portion of said window.

10. A non-transitory computer-readable storage medium containing a program recorded thereon that causes a computer including a display and an input device to execute the steps of:
    at an electronic device with a display and an input device:
    displaying a graphical user interface element on the display;
    while displaying the graphical user interface element on the display, detecting an input that includes transitioning the input device from a first state to a second state and movement input from the input device, wherein in both the first state and the second state the device is configured to detect movement input from the input device; and
    in response to the input:
    in accordance with a determination that the input device transitioned back from the second state to the first state within a threshold amount of time after the input device transitioned to the second state, adjusting the graphical user interface element in accordance with the movement input from the input device while the input device is in the second state and continuing to adjust the graphical user interface element in accordance with movement input from the input device while the input device is in the first state; and
    in accordance with a determination that the input device transitioned back from the second state to the first state after the threshold amount of time has elapsed, adjusting the graphical user interface element in accordance with movement input for the input device while the input device is in the second state and ceasing to adjust the graphical user interface element in accordance with the movement input from the input device after the input device has transitioned back to the first state.

11. The non-transitory computer-readable storage medium of claim 10, wherein said input device comprises an actuation element, and wherein said actuation element is not actuated in said first state and is actuated in said second state.

12. The non-transitory computer-readable storage medium of claim 11, wherein said actuation element is a button.

13. The non-transitory computer-readable storage medium of claim 10, wherein said graphical user interface element is an icon.

14. The non-transitory computer-readable storage medium of claim 10, wherein said graphical user interface element is a window.

15. The non-transitory computer-readable storage medium of claim 14, wherein adjusting said graphical user interface element in accordance with the movement input from the input device comprises:
    dragging the window about the user interface in accordance with the movement input from the input device.

16. The non-transitory computer-readable storage medium of claim 10, wherein said graphical user interface element is a resize box of a window, and wherein adjusting said graphical user interface element in accordance with the movement input from the input device comprises:

dragging said resize box about the user interface in accordance with the movement input from the input device, thereby resizing said window.

17. The non-transitory computer-readable storage medium of claim 10, wherein said graphical user interface element is a slider, and wherein adjusting said graphical user interface element in accordance with the movement input from the input device comprises:

dragging said slider in accordance with the movement input from the input device.

18. The non-transitory computer-readable storage medium of claim 17, wherein said slider is a component of a window, and wherein said dragging changes a viewable portion of said window.

19. A computer system comprising:
an input device;
a display; and
a processor configured to perform a method comprising:
displaying a graphical user interface element on the display;
while displaying the graphical user interface element on the display, detecting an input that includes transitioning the input device from a first state to a second state and movement input from the input device, wherein in both the first state and the second state the device is configured to detect movement input from the input device; and
in response to the input:
in accordance with a determination that the input device transitioned back from the second state to the first state within a threshold amount of time after the input device transitioned to the second state, adjusting the graphical user interface element in accordance with the movement input from the input device while the input device is in the second state and continuing to adjust the graphical user interface element in accordance with movement input from the input device while the input device is in the first state; and
in accordance with a determination that the input device transitioned back from the second state to the first state after the threshold amount of time has elapsed, adjusting the graphical user interface element in accordance with movement input for the input device while the input device is in the second state and ceasing to adjust the graphical user interface element in accordance with the movement input from the input device after the input device has transitioned back to the first state.

20. The computer system of claim 19, wherein said input device comprises an actuation element, and wherein said actuation element is not actuated in said first state and is actuated in said second state.

21. The computer system of claim 20, wherein said actuation element is a button.

22. The computer system of claim 19, wherein said graphical user interface element is an icon.

23. The computer system of claim 19, wherein said graphical user interface element is a window.

24. The computer system of claim 23, wherein adjusting said graphical user interface element in accordance with the movement input from the input device comprises dragging the window about the user interface in accordance with the movement input from the input device.

25. The computer system of claim 19, wherein said graphical user interface element is a resize box of a window, and wherein adjusting said graphical user interface element in accordance with the movement input from the input device comprises dragging said resize box about the user interface in accordance with the movement input from the input device, thereby resizing said window.

26. The computer system of claim 19, wherein said graphical user interface element is a slider, and wherein adjusting of said graphical user interface element in accordance with the movement input from the input device comprises dragging said slider in accordance with the movement input from the input device.

27. The computer system of claim 26, wherein said slider is a component of a window, and wherein said dragging changes a viewable portion of said window.

* * * * *